(12) United States Patent
Sato et al.

(10) Patent No.: US 9,506,425 B2
(45) Date of Patent: Nov. 29, 2016

(54) INTERNAL COMBUSTION ENGINE

(71) Applicant: HONDA MOTOR CO., LTD., Tokyo (JP)

(72) Inventors: Hiroaki Sato, Wako (JP); Atsushi Sato, Wako (JP); Hirosuke Niwa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 95 days.

(21) Appl. No.: 14/566,709

(22) Filed: Dec. 11, 2014

(65) Prior Publication Data
US 2015/0167591 A1    Jun. 18, 2015

(30) Foreign Application Priority Data
Dec. 16, 2013  (JP) ................. 2013-258905

(51) Int. Cl.
| | |
|---|---|
| F02B 25/06 | (2006.01) |
| F02M 25/06 | (2016.01) |
| F01M 13/04 | (2006.01) |
| F01M 13/00 | (2006.01) |
| F02M 35/10 | (2006.01) |

(52) U.S. Cl.
CPC .......... F02M 25/06 (2013.01); F01M 13/0011 (2013.01); F01M 13/04 (2013.01); *F01M 2013/005* (2013.01); *F01M 2013/0044* (2013.01); *F02M 35/10157* (2013.01); *Y02T 10/121* (2013.01)

(58) Field of Classification Search
CPC .......... F02M 25/06; F02M 35/10157; F02M 13/04; F01M 13/0011; F02M 13/023; F02M 2013/005; F02M 2013/0044; F02M 2013/0422; Y02T 10/121
USPC .................... 123/73 AD, 572–574
See application file for complete search history.

(56) References Cited

U.S. PATENT DOCUMENTS

| | | | | |
|---|---|---|---|---|
| 5,078,233 A | * | 1/1992 | Oetting | F01M 1/12 123/196 R |
| 6,394,078 B1 | * | 5/2002 | Kling | F01M 13/022 123/572 |

FOREIGN PATENT DOCUMENTS

| | | |
|---|---|---|
| JP | 11-148333 | 6/1999 |
| JP | 2005-42681 | 2/2005 |
| JP | 2006-194108 | 7/2006 |
| JP | 2008-95528 | 4/2008 |

OTHER PUBLICATIONS

Japanese Office Action for corresponding JP Application No. 2013-258905, Nov. 4, 2015 (w/ English machine translation).

\* cited by examiner

*Primary Examiner* — Hai Huynh
(74) *Attorney, Agent, or Firm* — Mori & Ward, LLP

(57) ABSTRACT

An internal combustion engine includes a supercharger, an oil tank, a scavenging pump, a first passage, a second passage, and a one-way valve. The supercharger is provided in an intake passage. The oil tank communicates with a crankcase via a collecting passage. The scavenging pump is provided in the collecting passage to transport a fluid in the crankcase to the oil tank. The first passage connects an upper space located above a liquid surface in the oil tank and a downstream portion of the intake passage located on a downstream side with respect to the supercharger. The second passage connects the upper space and an upstream portion of the intake passage located on an upstream side with respect to the supercharger. The one-way valve is provided in the first passage and allows the fluid to flow only from the upper space toward the intake passage.

20 Claims, 2 Drawing Sheets

INTERNAL COMBUSTION ENGINE

CROSS-REFERENCE TO RELATED APPLICATIONS

The present application claims priority under 35 U. S. C. §119 to Japanese Patent Application No. 2013-258905, filed Dec. 16, 2013. The contents of this application are incorporated herein by reference in their entirety.

BACKGROUND OF THE INVENTION

Field of the Invention

The present invention relates to an internal combustion engine.

Discussion of the Background

Regarding internal combustion engines, there is a known technique in which blow-by gas leaking from a cylinder into a crankcase is returned to an intake passage and is mixed with fresh air for combustion (see Japanese Unexamined Patent Application Publication No. 2006-194108, for example). In an internal combustion engine disclosed by Japanese Unexamined Patent Application Publication No. 2006-194108, a crankcase and a portion of an intake passage that is on the downstream side with respect to a throttle valve are connected to each other with a reflux passage. In the downstream portion of the intake passage, which is subject to an intake negative pressure generated by the reciprocating motion of a piston, the pressure is relatively lower than that in the crankcase. Therefore, blow-by gas flows from the crankcase into the intake passage. The reflux passage is provided with a one-way valve (a positive-crankcase-ventilation (PCV) valve) that allows a fluid to flow only from the crankcase toward the intake passage.

SUMMARY OF THE INVENTION

According to one aspect of the present invention, an internal combustion engine includes a supercharger, an oil tank, a scavenging pump, a first passage, a second passage, and a one-way valve. The supercharger is provided in an intake passage. The oil tank communicates with a crankcase via a collecting passage. The scavenging pump is provided in the collecting passage and configured to transport a fluid in the crankcase to the oil tank. The first passage allows an upper space in the oil tank that is above a liquid surface and a portion of the intake passage that is on a downstream side with respect to the supercharger to communicate with each other. The second passage allows the upper space and a portion of the intake passage that is on an upstream side with respect to the supercharger to communicate with each other. The one-way valve is provided in the first passage and allows the fluid to flow only from the upper space toward the intake passage.

According to another aspect of the present invention, an internal combustion engine includes a supercharger, an oil tank, a scavenging pump, a first passage, a second passage, and a one-way valve. The supercharger is provided in an intake passage. The oil tank communicates with a crankcase via a collecting passage. The scavenging pump is provided in the collecting passage to transport a fluid in the crankcase to the oil tank. The first passage connects an upper space located above a liquid surface in the oil tank and a downstream portion of the intake passage located on a downstream side with respect to the supercharger. The second passage connects the upper space and an upstream portion of the intake passage located on an upstream side with respect to the supercharger. The one-way valve is provided in the first passage and allows the fluid to flow only from the upper space toward the intake passage.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
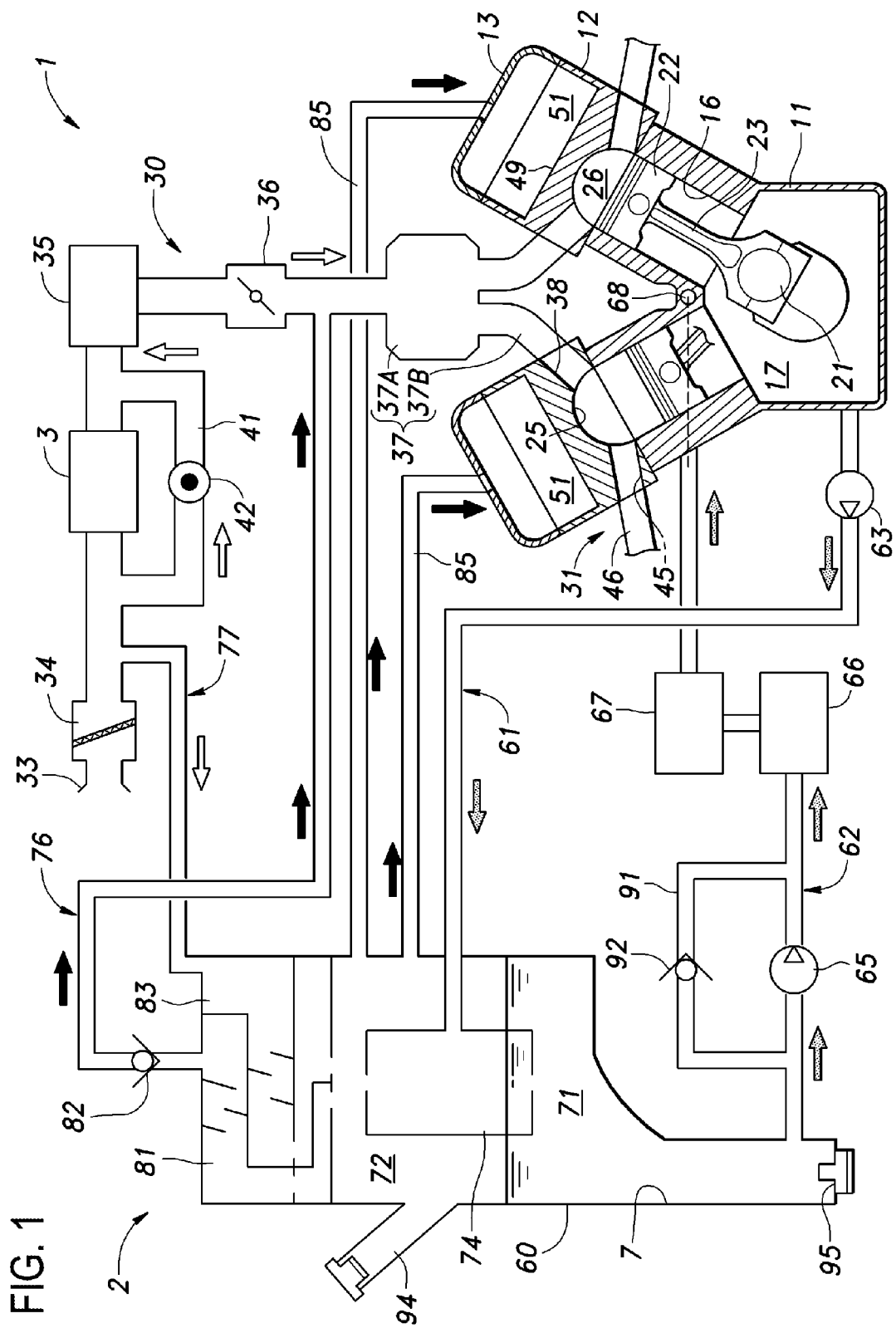
FIG. 1 is a schematic diagram of an internal combustion engine according to an embodiment and illustrates flows of blow-by gas, fresh air, and oil in a natural aspiration operation.

The embodiments will now be described with reference to the accompanying drawings, wherein like reference numerals designate corresponding or identical elements throughout the various drawings.

An embodiment of the present invention, which is applied to an internal combustion engine 1 included in a vehicle, will now be described in detail with reference to the accompanying drawings.

As illustrated in FIG. 1, the internal combustion engine 1 is a spark-ignition, V-type gasoline engine including a dry-sump lubricator 2 and a supercharger 3. The internal combustion engine 1 includes a cylinder block 11, a pair of cylinder heads 12 joined to respective upper portions of the cylinder block 11, and a pair of head covers 13 joined to the respective cylinder heads 12. The cylinder block 11 has a plurality of cylinder bores 16 provided in correspondence with respective banks, and a crankcase 17 communicating with the lower ends of the cylinder bores 16. The crankcase 17 is provided with a crankshaft 21 that is rotatable with respect thereto. The crankshaft 21 is supported by bearings (not illustrated) provided to the cylinder block 11. The crankshaft 21 is connected to pistons 22 with respective connecting rods 23 interposed therebetween. The pistons 22 are slidably provided in the respective cylinder bores 16.

The cylinder heads 12 each have a combustion chamber recess 25 in a surface thereof adjoining the cylinder block 11 and at a position facing a corresponding one of the cylinder bores 16. A combination of the combustion chamber recess 25 and the cylinder bore 16 provides a combustion chamber 26. The combustion chamber 26 communicates with an intake passage 30 and with an exhaust passage 31. The intake passage 30 includes, in order from the upstream side thereof, an air inlet 33, an air filter 34, the supercharger 3, an intercooler 35, a throttle valve 36, an intake manifold 37, and intake ports 38, all of which are connected in series. The intake passage 30 further includes a bypass passage 41 that allows a portion of the intake passage 30 that is between the air filter 34 and the supercharger 3 and a portion of the intake passage 30 that is between the supercharger 3 and the intercooler 35 to communicate with each other. The bypass passage 41 is provided with a bypass valve 42 that opens and closes the bypass passage 41. The bypass valve 42 is controlled to be opened or closed by an electronic control unit (ECU, not illustrated).

The air inlet 33 is an opening from which air is taken and is provided at the extreme upstream end of the intake passage 30. The air filter 34 includes a filter member and removes foreign substances, such as dust, contained in the air.

The supercharger 3 may be a known exhaust-turbine supercharger, such as a turbocharger, or a mechanically driven supercharger. If the supercharger 3 is a turbocharger, a compressor included in the turbocharger is provided in the intake passage 30 while a turbine is provided in the exhaust passage 31. Cooling water flows through the intercooler 35. The intercooler 35 cools and thus contracts the air that has been compressed by the supercharger 3 and has thus expanded with a rise of its temperature.

The throttle valve 36 controls the flow rate of intake air flowing in the intake passage 30 and may be a known butterfly valve. The intake manifold 37 includes a collective chamber 37A provided on an upstream portion thereof, and branch pipes 37B extending from the collective chamber 37A and provided in correspondence with the intake ports 38. The collective chamber 37A is provided on the upper side of the internal combustion engine 1, specifically, between the pair of cylinder heads 12. The intake ports 38 are provided in the respective cylinder heads 12 and each extend from a side of a corresponding one of the cylinder heads 12 that faces toward the other cylinder head 12 (hereinafter referred to as the inner side of the cylinder head 12) up to a corresponding one of the combustion chamber recesses 25.

Figure 2:
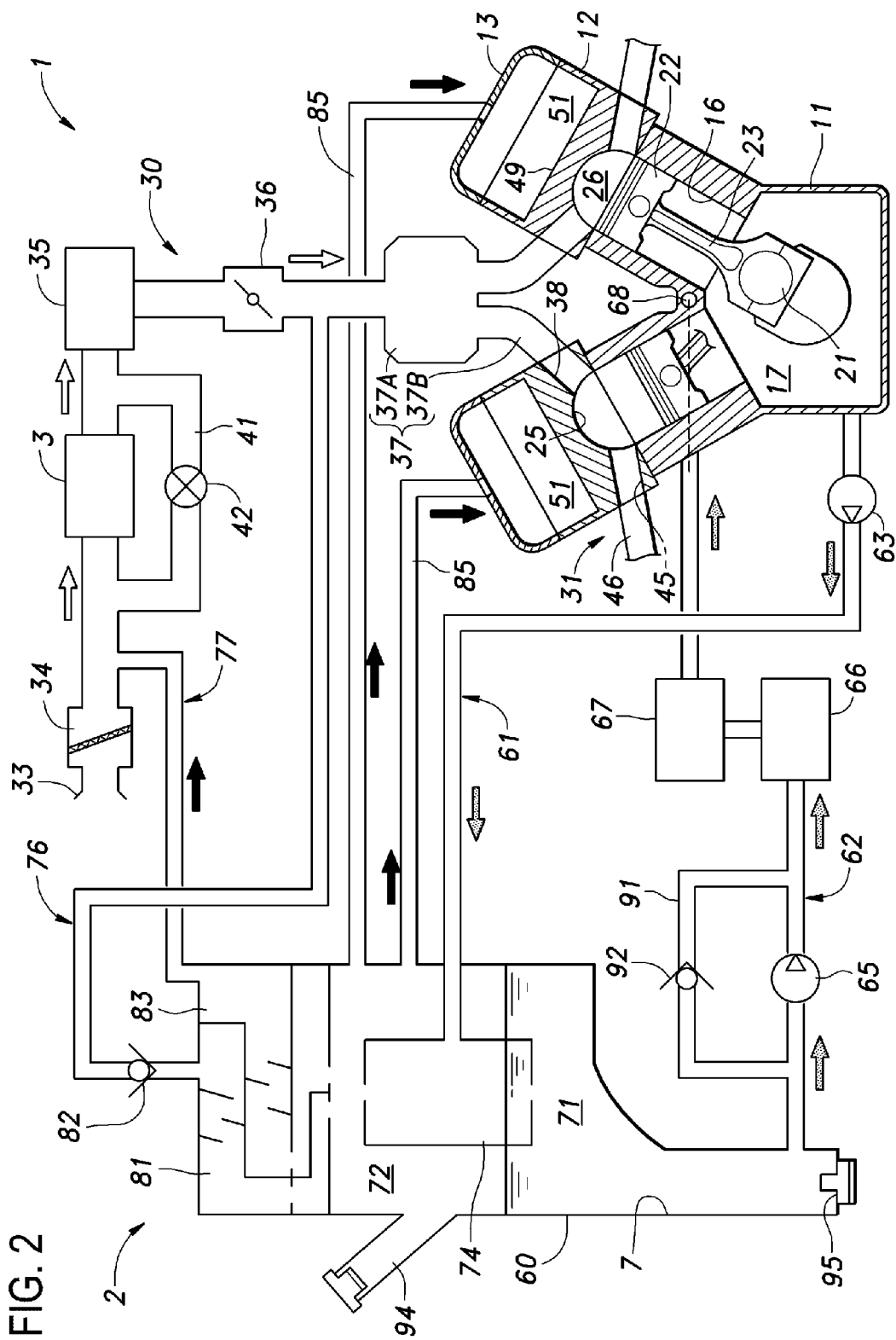
FIG. 2 is a schematic diagram of the internal combustion engine according to the embodiment and illustrates flows of blow-by gas, fresh air, and oil in a supercharged operation.

In a natural aspiration operation in which the supercharger 3 is not in operation, the bypass valve 42 is open. Therefore, air (fresh air) taken from the air inlet 33 flows through the air filter 34, flows into the bypass passage 41 while detouring the supercharger 3, flows through the intercooler 35, the throttle valve 36, the intake manifold 37, and the intake ports 38 in that order, and reaches the combustion chambers 26 (as illustrated by white arrows in FIG. 1). In a supercharged operation in which the supercharger 3 is in operation, as illustrated in FIG. 2, the bypass valve 42 is closed. Therefore, air (fresh air) taken from the air inlet 33 flows through the air filter 34, the supercharger 3, the intercooler 35, the throttle valve 36, the intake manifold 37, and the intake ports 38 in that order and reaches the combustion chambers 26 (as illustrated in white arrows in FIG. 2).

As illustrated in FIG. 1, the exhaust passage 31 includes, in order from the upstream side thereof, exhaust ports 45, an exhaust manifold 46, a catalytic converter (not illustrated), a muffler (not illustrated), and an air outlet (not illustrated). The exhaust ports 45 are provided in the respective cylinder heads 12 and each extend from a corresponding one of the combustion chamber recesses 25 up to a side of a corresponding one of the cylinder heads 12 that is opposite the inner side (hereinafter referred to as the outer side of the cylinder head 12). The exhaust manifold 46 is connected to the outer side of each of the cylinder heads 12 in such a manner as to communicate with the exhaust ports 45. If the supercharger 3 is a turbocharger, the turbine of the supercharger 3 may be provided in the exhaust passage 31 between the exhaust manifold 46 and the catalytic converter.

The intake ports 38 and the exhaust ports 45 are provided with intake valves (not illustrated) and exhaust valves (not illustrated), respectively. The cylinder heads 12 each include an upper deck 49 in an upper portion thereof. The upper deck 49 is provided with a valve gear mechanism (not illustrated) that drives a corresponding one of the intake valves and a corresponding one of the exhaust valves. The head covers 13 are joined to the respective cylinder heads 12 in such a manner as to cover the respective upper decks 49 provided with the valve gear mechanisms, whereby valve gear cases (cam chambers) 51 that house the respective valve gear mechanisms are provided between the respective head covers 13 and the respective cylinder heads 12. The valve gear mechanisms each include valve springs urging the intake valve and the exhaust valve, respectively, in respective directions in which the valves are closed; intake-side and exhaust-side cam shafts rotatably attached to the cylinder head 12 and configured to rotate synchronously with the crankshaft 21; rocker arms rotatably attached to respective rocker shafts attached to the cylinder head 12, the rocker arms being configured to move the intake valve and the exhaust valve, by being pushed by the respective cam shafts, in respective directions in which the valves are opened; and so forth.

The dry-sump lubricator 2 supplies oil (a lubricant) to lubrication objects (not illustrated) and to hydraulic devices (not illustrated) included in the internal combustion engine 1. The lubrication objects include the bearings supporting the crankshaft 21, portions where the pistons 22 and the cylinder bores 16 are in slide contact with each other, bearings supporting the cam shafts, portions where the rocker arms and the rocker shafts are in slide contact with each other, portions where the cam shafts and the intake and exhaust valves are in slide contact with each other, and so forth. The hydraulic devices include variable valve-timing mechanisms that change the timings of opening/closing of the intake valves and the exhaust valves, variable valve-lifting mechanisms that change the amounts of lifting of the intake valves and the exhaust valves, cylinder stopping mechanisms that stop the opening/closing of the intake valves and the exhaust valves, and so forth.

The lubricator 2 includes an oil tank 60, a collecting passage 61 that allows the oil tank 60 to communicate with the crankcase 17, and a supply passage 62 that allows the oil tank 60 to communicate with the lubrication objects and the hydraulic devices included in the internal combustion engine 1. The collecting passage 61 is provided with a scavenging pump 63 that transports a fluid containing oil and blow-by gas in the crankcase 17 to the oil tank 60. The supply passage 62 is provided with, in order from the upstream side thereof where the supply passage 62 communicates with the oil tank 60, a feed pump 65, an oil cooler 66, an oil filter 67, and a main gallery 68 that is provided in the cylinder block 11. The scavenging pump 63 and the feed pump 65 are each a known pump and may be, for example, a positive displacement pump such as a trochoid pump.

The oil tank 60 is a container extending vertically and has an internal space 71 in which oil is stored. The oil tank 60 always stores at least a predetermined amount of oil in the internal space 71. The shape of the oil tank 60 is determined such that a portion of the internal space 71 that communicates with the supply passage 62 is always below the oil surface even if a force of inertia due to the acceleration, deceleration, turning, or any other behavior of the vehicle carrying the internal combustion engine 1 acts on the oil in the oil tank 60. In the present embodiment, the oil tank 60 is shaped such that a lower portion thereof is narrower than an upper portion thereof. A portion of the internal space 71 of the oil tank 60 that is above the oil surface is hereinafter referred to as upper space 72.

The oil tank 60 is provided with an upstream-side gas-liquid separator 74 in the upper space 72. The collecting passage 61 is a pipe with the opening at one end (upstream end) thereof provided in the inner surface of the cylinder block 11, whereby the collecting passage 61 communicates with the crankcase 17. The other end (downstream end) of the collecting passage 61 extends into the upper space 72 of the oil tank 60 and communicates with the upstream-side gas-liquid separator 74.

The upper space 72 of the oil tank 60 communicates with a portion of the intake passage 30 that is between the throttle valve 36 and the intake manifold 37, i.e., a portion on the downstream side with respect to the supercharger 3, via a first blow-by passage (first passage) 76. The upper space 72 of the oil tank 60 also communicates with a portion of the intake passage 30 that is between the air filter 34 and the upstream end of the bypass passage 41, i.e., a portion on the upstream side with respect to the supercharger 3, via a second blow-by passage (second passage) 77.

The first blow-by passage 76 is provided with, in order from the upstream side thereof, a first gas-liquid separator 81 and a PCV valve 82. The first gas-liquid separator 81 is provided at the upstream end of the first blow-by passage 76 and is integrated with the oil tank 60 in an upper portion of the upper space 72 in the oil tank 60. The PCV valve 82 is a one-way valve that opens when the pressure in the upper space 72 comes to differ from the pressure in the intake passage 30 by a predetermined value or greater, thereby allowing the fluid to flow only in a direction from the upper space 72 toward the intake passage 30. A portion of the first blow-by passage 76 that is on the downstream side with respect to the first gas-liquid separator 81 is, for example, a pipe or a hose. The PCV valve 82 is provided on the wall of the first gas-liquid separator 81 (the oil tank 60).

The second blow-by passage 77 is provided with a second gas-liquid separator 83. The second gas-liquid separator 83 is provided at the upstream end of the second blow-by passage 77 and is integrated with the oil tank 60. The second gas-liquid separator 83 is provided, together with the first gas-liquid separator 81, in the upper portion of the upper space 72 in the oil tank 60. A portion of the second blow-by passage 77 that is on the downstream side with respect to the second gas-liquid separator 83 is, for example, a pipe or a hose.

The upstream-side gas-liquid separator 74, the first gas-liquid separator 81, and the second gas-liquid separator 83 may each be a known gas-liquid separator, for example, a baffle-type gas-liquid separator in which a plurality of baffles are provided in a passage so that the flow of a fluid collides with the baffles and droplets of liquid contained in the fluid adhere to the baffles, whereby the liquid is separated from the fluid; or a cyclone-type gas-liquid separator in which a fluid is introduced thereinto in such a manner as to produce a swirl flow so that droplets of liquid contained in the fluid adhere to a radially outer wall of the separator under a centrifugal force, whereby the liquid is separated from the fluid. In the present embodiment, for example, the upstream-side gas-liquid separator 74 is of a cyclone type, and the first gas-liquid separator 81 and the second gas-liquid separator 83 are of a baffle type.

The upper space 72 of the oil tank 60 communicates with the crankcase 17 via a pair of return passages (third passages) 85. One end of each of the return passages 85 communicates with the upper space 72. The opening at the other end of each of the return passages 85 is provided in the inner surface of a corresponding one of the head covers 13, whereby the return passages 85 communicate with the respective valve gear cases 51.

One end (the upstream end) of the supply passage 62 communicates with a lower portion of the oil tank 60 that is always below the oil surface regardless of the behavior, such as acceleration, deceleration, turning, or the like, of the vehicle. The supply passage 62 includes a relief oil passage 91 that allows a portion of the supply passage 62 that is between the oil tank 60 and the feed pump 65 (i.e., a portion on the upstream side with respect to the feed pump 65) and a portion of the supply passage 62 that is between the feed pump 65 and the oil cooler 66 (i.e., a portion on the downstream side with respect to the feed pump 65) to communicate with each other. The relief oil passage 91 is provided with a relief valve 92. The relief valve 92 is normally closed and only opens when the pressure in the portion on the downstream side with respect to the feed pump 65 comes to differ from the pressure in the portion on the upstream side with respect to the feed pump 65 by a predetermined value or greater, whereby the oil is allowed to flow from the downstream portion toward the upstream portion. That is, when the pressure on the downstream side with respect to the feed pump 65 is increased by the feed pump 65, the relief valve 92 releases the oil to the upstream side with respect to the feed pump 65, thereby suppressing an excessive rise of the pressure.

The oil tank 60 has an oil supply port 94 provided on a side thereof and communicating with the upper space 72, and an oil discharge port 95 provided at the bottom thereof. The oil supply port 94 and the oil discharge port 95 are openably closed with respective caps.

An operation of the internal combustion engine 1 configured as described above will now be described. As illustrated in FIG. 1, when the feed pump 65 is activated, the oil stored in the oil tank 60 is transported to the main gallery 68 via the oil cooler 66 and the oil filter 67 in that order and is supplied from the main gallery 68 to the lubrication objects and the hydraulic devices included in the internal combustion engine 1 (as illustrated by hatched arrows in FIG. 1). That is, the oil in the oil tank 60 is supplied to the above associated elements of the internal combustion engine 1 via the supply passage 62. In this process, since one end of the supply passage 62 communicates with the lower portion of the oil tank 60 that is always below the oil surface regardless of the behavior, such as acceleration, deceleration, turning, or the like, of the vehicle, the one end of the supply passage 62 is not positioned above the oil surface. Hence, air is prevented from being taken into the supply passage 62.

The oil supplied to the lubrication objects and the hydraulic devices included in the internal combustion engine 1 flows downward in the internal combustion engine 1 under the gravitational force and is collected at the bottom of the crankcase 17. For example, portions of the oil that have been supplied to the bearings supporting the crankshaft 21 and the portions where the pistons 22 and the cylinder bores 16 are in slide contact with each other run along inner walls of the cylinder block 11 or drop onto the bottom of the crankcase 17. Portions of the oil that have been supplied to the bearings supporting the cam shafts and the hydraulic devices such as the variable valve-timing mechanisms drop onto the upper decks 49 of the cylinder heads 12, flow through oil return passages (not illustrated), and reach the bottom of the crankcase 17.

The crankcase 17 contains blow-by gas ejected from the portion between each of the cylinder bores 16 and a corresponding one of the pistons 22. The blow-by gas contains a gasified fuel that is yet to be combusted. When the scavenging pump 63 is activated, the oil collected at the bottom of the crankcase 17 and the gas containing the blow-by gas and being present in the crankcase 17 are collectively transported to the upstream-side gas-liquid separator 74 provided in the oil tank 60 via the collecting passage 61 (as illustrated by hatched arrows in FIG. 1). The upstream-side gas-liquid separator 74 separates the mixture of the oil and the gas that has been supplied from the collecting passage 61 into the oil, i.e., liquid, and the gas containing the blow-by gas. The oil obtained through the separation flows downward under the gravitational force and is mixed with the oil stored in the oil tank 60. Thus, the oil is made to circulate through the internal combustion engine 1 by the lubricator 2.

The gas containing the blow-by gas separated from the oil by the upstream-side gas-liquid separator 74 is diffused in the upper space 72 of the oil tank 60. With the activation of the scavenging pump 63, the pressure in the upper space 72 of the oil tank 60 becomes higher than the pressure in the crankcase 17.

As illustrated in FIG. 1, in the natural aspiration operation in which the supercharger 3 is not in operation, the bypass passage 41 is open. Therefore, the intake air flows into the bypass passage 41 while detouring the supercharger 3 and reaches the combustion chambers 26 (as illustrated by white arrows in FIG. 1). In the natural aspiration operation, since air is taken in with the reciprocating motion of the pistons 22, the pressure in the intake passage 30 is lower on the downstream side with respect to the supercharger 3 than on the upstream side with respect to the supercharger 3. Furthermore, in the portion of the intake passage 30 that is on the downstream side with respect to the supercharger 3, the pressure is lower on the downstream side with respect to the throttle valve 36 than on the upstream side with respect to the throttle valve 36. Therefore, the pressure at the end of the first blow-by passage 76 that is connected to the intake passage 30 is lower than the pressure at the end of the second blow-by passage 77 that is connected to the intake passage 30.

In the natural aspiration operation, the pressure in the first blow-by passage 76 is higher on the side nearer to the oil tank 60 than on the side nearer to the intake passage 30. Therefore, the PCV valve 82 is opened, and the gas containing the blow-by gas and being present in the upper space 72 is allowed to flow into the first blow-by passage 76 through the first gas-liquid separator 81 and the PCV valve 82 toward the intake passage 30 (as illustrated by black arrows in FIG. 1). Then, the gas containing the blow-by gas is mixed with fresh air (illustrated by white arrows in FIG. 1) in the intake passage 30, and the mixture flows into the combustion chambers 26. Thus, in the natural aspiration operation, the blow-by gas is supplied to the combustion chambers 26 via the first blow-by passage 76.

Meanwhile, the pressure in the second blow-by passage 77 is higher on the side nearer to the intake passage 30 than on the side nearer to the oil tank 60. Therefore, the fresh air in the intake passage 30 flows into the second blow-by passage 77 and reaches the upper space 72 of the oil tank 60 (as illustrated by a white arrow in FIG. 1). Since the fresh air flows into the upper space 72, the concentration of the blow-by gas in the upper space 72 is reduced. That is, some of the gas in the upper space 72 is replaced with the fresh air.

Since the scavenging pump 63 is in operation, the pressure in the pair of return passages 85 is higher on the side nearer to the oil tank 60 than on the side nearer to the valve gear cases 51. Therefore, the gas in the upper space 72 flows into the return passages 85 and reaches the valve gear cases 51 (as illustrated by black arrows in FIG. 1).

As illustrated in FIG. 2, in the supercharged operation in which the supercharger 3 is in operation, the bypass passage 41 is closed. Therefore, the intake air flows into the supercharger 3 and reaches the combustion chambers 26. In the supercharged operation, since the supercharger 3 is in operation, the pressure in the intake passage 30 is higher on the downstream side with respect to the supercharger 3 than on the upstream side with respect to the supercharger 3.

In the supercharged operation, the pressure in the first blow-by passage 76 is higher on the side nearer to the intake passage 30 than on the side nearer to the oil tank 60. Therefore, the PCV valve 82 is closed, whereby the flow of the gas is stopped.

With the suction by the supercharger 3, the pressure in the portion of the second blow-by passage 77 on the side nearer to the intake passage 30 is negative. That is, the pressure in the second blow-by passage 77 is higher on the side nearer to the oil tank 60 than on the side nearer to the intake passage 30. Hence, the gas containing the blow-by gas and being present in the upper space 72 flows into the second gas-liquid separator 83, flows through the second blow-by passage 77 toward the intake passage 30 (as illustrated by a black arrow in FIG. 2), is mixed with fresh air (illustrated by a white arrow in FIG. 2) in the intake passage 30, flows through the supercharger 3, the intercooler 35, and the throttle valve 36 in that order, and reaches the combustion chambers 26. Thus, in the supercharged operation, the blow-by gas is supplied to the combustion chambers 26 via the second blow-by passage 77.

In the supercharged operation also, there is a pressure difference between the two ends of each of the pair of return passages 85 with the activation of the scavenging pump 63. Therefore, the gas in the upper space 72 flows into the return passages 85 and reaches the valve gear cases 51.

As described above, the internal combustion engine 1 according to the present embodiment is capable of supplying the blow-by gas to the combustion chambers 26 both in the natural aspiration operation and in the supercharged operation.

Advantageous effects produced by the internal combustion engine 1 configured as described above will now be described. In the present embodiment, the internal combustion engine 1 includes the dry-sump lubricator 2, and oil is stored in the oil tank 60. Therefore, in the crankcase 17, the contact between the high-temperature blow-by gas ejected from the gap between each of the cylinder bores 16 and a corresponding one of the pistons 22 and oil is suppressed. Accordingly, the deterioration of the oil is suppressed.

The pressure in the upper space 72 of the oil tank 60 is made higher than the pressure in the crankcase 17 by the scavenging pump 63. Furthermore, one end of the first blow-by passage 76 and one end of the second blow-by passage 77 are connected to the upper space 72. Therefore, the pressure difference between the two ends of each of the first blow-by passage 76 and the second blow-by passage 77 is larger than in a case where the first blow-by passage 76 and the second blow-by passage 77 are connected to the crankcase 17. Hence, the blow-by gas more easily flows into the first blow-by passage 76 or the second blow-by passage 77 and reaches the intake passage 30. More specifically, in the natural aspiration operation, the pressure in the first blow-by passage 76 is higher on the side nearer to the oil tank 60 than on the side nearer to the intake passage 30. In the supercharged operation, the pressure in the second blow-by passage 77 is higher on the side nearer to the oil tank 60 than on the side nearer to the intake passage 30. Meanwhile, the pressure in the crankcase 17 is made lower than the pressure in the upper space 72 by the activation of the scavenging pump 63. Therefore, if the end of each of the first blow-by passage 76 and the second blow-by passage 77 is connected to the crankcase 17, the pressure difference between the two ends of each of the first blow-by passage 76 and the second blow-by passage 77 is reduced. Consequently, the flow of the gas containing the blow-by gas and proceeding toward the intake passage 30 is decelerated.

As described above, in the internal combustion engine 1 including the dry-sump lubricator 2 and the supercharger 3 that is provided in the intake passage 30, the blow-by gas is efficiently introduced into the intake passage 30 both in the natural aspiration operation and in the supercharged operation.

Furthermore, since the upper space 72 of the oil tank 60 and the valve gear cases 51 are allowed to communicate with each other by the return passages 85, the gas in the upper space 72 is allowed to flow into the return passages 85 and to reach the valve gear cases 51.

The end of the first blow-by passage 76 that is nearer to the intake passage 30 is connected to the portion of the intake passage 30 that is on the downstream side with respect to the throttle valve 36. Therefore, in the natural aspiration operation, the reduction in the pressure at the end of the first blow-by passage 76 that is nearer to the intake passage 30 is facilitated more and the pressure difference between the two ends of the first blow-by passage 76 becomes larger than in a case where the end of the first blow-by passage 76 that is nearer to the intake passage 30 is connected to the portion of the intake passage 30 that is on the upstream side with respect to the throttle valve 36. Hence, the blow-by gas more easily flows from the upper space 72 through the first blow-by passage 76 toward the intake passage 30. Furthermore, since the blow-by gas that has flowed through the first blow-by passage 76 does not flow through the throttle valve 36, foreign substances, such as oil, contained in the blow-by gas becomes less likely to adhere to the throttle valve 36.

The first gas-liquid separator 81 and the second gas-liquid separator 83 are integrated with the oil tank 60. Therefore, the lubricator 2 has a simpler configuration and a smaller size. Accordingly, the internal combustion engine 1 has a simpler configuration and a smaller size.

While a specific embodiment of the present invention has been described, the present invention is not limited to the above embodiment and can be modified broadly. For example, the internal combustion engine 1 is not limited to a spark-ignition engine and may be a diesel engine. Furthermore, the internal combustion engine 1 may be a known engine such as a straight multiple-cylinder engine. Furthermore, the end of the first blow-by passage 76 that is nearer to the intake passage 30 is not limited to be connected to the portion between the throttle valve 36 and the intake manifold 37 and may be connected to the collective chamber 37A of the intake manifold 37. Furthermore, if the internal combustion engine 1 is a diesel engine, the throttle valve 36 may be omitted.

An internal combustion engine (1) according to an aspect of the embodiment of the present invention includes a supercharger (3) provided in an intake passage (30), an oil tank (60) communicating with a crankcase (17) via a collecting passage (61), a scavenging pump (63) provided in the collecting passage and configured to transport a fluid in the crankcase to the oil tank, a first passage (76) allowing an upper space (72) in the oil tank that is above a liquid surface and a portion of the intake passage that is on a downstream side with respect to the supercharger to communicate with each other, a second passage (77) allowing the upper space and a portion of the intake passage that is on an upstream side with respect to the supercharger to communicate with each other, and a one-way valve (82) provided in the first passage and allowing the fluid to flow only from the upper space toward the intake passage.

In such a configuration, blow-by gas flows through the first passage into the intake passage in a natural aspiration operation in which the supercharger is not in operation, and flows through the second passage into the intake passage in a supercharged operation in which the supercharger is in operation. In the natural aspiration operation, an intake negative pressure is generated in the intake passage by a reciprocating motion of a piston. Therefore, the pressure in the intake passage is lower on the downstream side (a side nearer to a cylinder). Accordingly, the pressure difference between two ends of the first passage is larger than the pressure difference between two ends of the second passage. Consequently, blow-by gas flows from the upper space of the oil tank into the first passage and further flows into the portion of the intake passage that is on the downstream side with respect to the supercharger.

In contrast, in the supercharged operation, since the supercharger is in operation, the pressure in the portion of the intake passage that is on the downstream side with respect to the supercharger is higher than the pressure in the portion of the intake passage that is on the upstream side with respect to the supercharger and than the pressure in the upper space of the oil tank. In such a state, the one-way valve provided in the first passage is closed and thus prevents the gas from the portion of the intake passage that is on the downstream side with respect to the supercharger from flowing toward the upper space of the oil tank. Furthermore, since the suction by the supercharger makes the pressure in the portion of the intake passage that is on the upstream side with respect to the supercharger lower than the pressure in the upper space of the oil tank, blow-by gas flows from the upper space, flows through the second passage, and flows into the portion of the intake passage that is on the upstream side with respect to the supercharger. Thus, the passage through which blow-by gas flows is automatically changed between that for the natural aspiration operation and that for the supercharged operation, whereby the blow-by gas assuredly flows from the upper space of the oil tank into the intake passage.

Furthermore, the pressure in the upper space of the oil tank is made higher than the pressure in the crankcase by the activation of the scavenging pump. Therefore, in the case where one end of each of the first passage and the second passage is connected to the upper space, the pressure difference between the two ends of each of the first passage and the second passage becomes larger than in a case where one end of each of the first passage and the second passage is connected to the crankcase. Consequently, blow-by gas easily flows into the intake passage via the first and second passages.

It is preferable that the internal combustion engine according to the above aspect of the embodiment of the present invention further include a valve gear case (51) provided between a cylinder head (12) and a head cover (13) joined to the cylinder head, and a third passage (85) allowing the upper space and the valve gear case to communicate with each other.

In such a configuration, in the natural aspiration operation, a gas passage extending from the intake passage, passing through the second passage, the upper space of the oil tank, and the third passage in that order, and reaching the valve gear case is provided, whereby fresh air is introduced into the valve gear case. In the natural aspiration operation, the pressure in the portion of the intake passage that is on the upstream side with respect to the supercharger is higher than the pressure in the upper space of the oil tank. Therefore, fresh air flows from the portion of the intake passage that is on the upstream side with respect to the supercharger into the upper space of the oil tank via the second passage. Since the pressure in the upper space is made higher than the pressure in the valve gear case by the activation of the scavenging pump, the gas in the upper space flows into the valve gear case via the third passage.

It is preferable that the internal combustion engine according to the above aspect of the embodiment of the present invention further include a throttle valve (36) provided in the portion of the intake passage that is on the downstream side with respect to the supercharger, and that the first passage communicate with a portion of the intake passage that is on the downstream side with respect to the throttle valve.

In such a configuration, the pressure difference between the two ends of the first passage is increased, making it easier for blow-by gas to flow through the first passage into the intake passage. The pressure in the intake passage is lower on the downstream side with respect to the throttle valve than on the upstream side with respect to the throttle valve because of the influence of the intake negative pressure generated by the reciprocating motion of the piston. Therefore, the first passage is made to communicate with the portion of the intake passage that is on the downstream side with respect to the throttle valve, not with the portion of the intake passage that is on the upstream side with respect to the throttle valve. Thus, the pressure difference between the two ends of the first passage is increased. Furthermore, since the blow-by gas having flowed through the first passage does not flow through the throttle valve, the adhesion of foreign substances, such as oil, contained in the blow-by gas to the throttle valve is suppressed.

In the above aspect of the embodiment of the present invention, it is preferable that the first passage be provided with a first gas-liquid separator (81) configured to remove liquid from the fluid passing through the first gas-liquid separator and to return the liquid into the oil tank.

In such a configuration, since a liquid portion, such as oil, of the blow-by gas flowing in the first passage is separated from the blow-by gas, the adhesion of the liquid portion to the inner surface of the intake passage is suppressed. Furthermore, since oil is collected from the blow-by gas, the reduction in the amount of oil (the oil exhaustion) is reduced.

In the above aspect of the embodiment of the present invention, it is preferable that the first gas-liquid separator be integrated with the oil tank.

In such a configuration, since the oil tank has the upper space in which the first gas-liquid separator is provided, the configuration including the first passage and the first gas-liquid separator is simplified. Consequently, the size of the internal combustion engine as a whole can be reduced.

In the above aspect of the embodiment of the present invention, it is preferable that the second passage be provided with a second gas-liquid separator (83) configured to remove liquid from the fluid passing through the second gas-liquid separator and to return the liquid into the oil tank.

In such a configuration, since a liquid portion, such as oil, of the blow-by gas flowing in the second passage is separated from the blow-by gas, the adhesion of the liquid portion to the inner surface of the intake passage is suppressed. Furthermore, since oil is collected from the blow-by gas, the reduction in the amount of oil is reduced.

In the above aspect of the embodiment of the present invention, it is preferable that the second gas-liquid separator be integrated with the oil tank.

In such a configuration, since the oil tank has the upper space in which the second gas-liquid separator is provided, the configuration including the second passage and the second gas-liquid separator is simplified. Consequently, the size of the internal combustion engine as a whole can be reduced.

According to the above aspect of the embodiment of the present invention, in the internal combustion engine including the supercharger provided in the intake passage, blow-by gas can be efficiently introduced into the intake passage both in the natural aspiration operation and in the supercharged operation.

Obviously, numerous modifications and variations of the present invention are possible in light of the above teachings. It is therefore to be understood that within the scope of the appended claims, the invention may be practiced otherwise than as specifically described herein.

What is claimed is:

1. An internal combustion engine comprising:
a supercharger provided in an intake passage;
an oil tank communicating with a crankcase via a collecting passage;
a scavenging pump provided in the collecting passage and configured to transport a fluid in the crankcase to the oil tank;
a first passage allowing an upper space in the oil tank that is above a liquid surface and a portion of the intake passage that is on a downstream side with respect to the supercharger to communicate with each other;
a second passage allowing the upper space and a portion of the intake passage that is on an upstream side with respect to the supercharger to communicate with each other; and
a one-way valve provided in the first passage and allowing the fluid to flow only from the upper space toward the intake passage,
the second passage allows the fluid to flow from the intake passage to the upper space and from the upper space to the intake passage.

2. The internal combustion engine according to claim 1, further comprising:
a valve gear case provided between a cylinder head and a head cover joined to the cylinder head; and
a third passage allowing the upper space and the valve gear case to communicate with each other.

3. The internal combustion engine according to claim 1, further comprising:
a throttle valve provided in the portion of the intake passage that is on the downstream side with respect to the supercharger,
wherein the first passage communicates with a portion of the intake passage that is on the downstream side with respect to the throttle valve.

4. The internal combustion engine according to claim 1, wherein the first passage is provided with a first gas-liquid separator configured to remove liquid from the fluid passing through the first gas-liquid separator and to return the liquid into the oil tank.

5. The internal combustion engine according to claim 4, wherein the first gas-liquid separator is integrated with the oil tank.

6. The internal combustion engine according to claim 1, wherein the second passage is provided with a second gas-liquid separator configured to remove liquid from the fluid passing through the second gas-liquid separator and to return the liquid into the oil tank.

7. The internal combustion engine according to claim 6, wherein the second gas-liquid separator is integrated with the oil tank.

8. The internal combustion engine according to claim 1, wherein the fluid in the upper space flows to the intake passage through the first passage and fresh air in the intake passage flows to the upper space through the second passage, when in a natural aspiration operation where the supercharger is not driven, and
wherein the fluid in the upper space flows to the portion of the intake passage that is on the upstream side with respect to the supercharger, when in a supercharged operation where the supercharger is driven.

9. The internal combustion engine according to claim 1, wherein the intake passage further comprises:
a bypass passage that allows the upstream side with respect to the supercharger to communicate with the downstream side with respect to the supercharger; and
a bypass valve that opens and closes the bypass passage.

10. The internal combustion engine according to claim 9, further comprising:
an intercooler provided in the intake passage on the downstream side with respect to the supercharger,
wherein a downstream side of the bypass passage connects at a first location downstream of the supercharger and upstream of the intercooler,
wherein an upstream side of the bypass passage connects at a second location downstream of the second passage connecting to the intake passage and upstream of the supercharger, and
wherein the first passage connects to the intake passage at a third location downstream of the intercooler.

11. An internal combustion engine comprising:
a supercharger provided in an intake passage;
an oil tank communicating with a crankcase via a collecting passage;
a scavenging pump provided in the collecting passage to transport a fluid in the crankcase to the oil tank;
a first passage connecting an upper space located above a liquid surface in the oil tank and a downstream portion of the intake passage located on a downstream side with respect to the supercharger;
a second passage connecting the upper space and an upstream portion of the intake passage located on an upstream side with respect to the supercharger; and
a one-way valve provided in the first passage and allowing the fluid to flow only from the upper space toward the intake passage,
the second passage allows the fluid to flow from the intake passage to the upper space and from the upper space to the intake passage.

12. The internal combustion engine according to claim 11, further comprising:
a valve gear case provided between a cylinder head and a head cover joined to the cylinder head; and
a third passage connecting the upper space and the valve gear case.

13. The internal combustion engine according to claim 11, further comprising:
a throttle valve provided in the downstream portion of the intake passage,
wherein the first passage communicates with a portion of the intake passage located on a downstream side with respect to the throttle valve.

14. The internal combustion engine according to claim 11, wherein the first passage is provided with a first gas-liquid separator configured to remove liquid from the fluid passing through the first gas-liquid separator and to return the liquid into the oil tank.

15. The internal combustion engine according to claim 14, wherein the first gas-liquid separator is integrated with the oil tank.

16. The internal combustion engine according to claim 11, wherein the second passage is provided with a second gas-liquid separator configured to remove liquid from the fluid passing through the second gas-liquid separator and to return the liquid into the oil tank.

17. The internal combustion engine according to claim 16, wherein the second gas-liquid separator is integrated with the oil tank.

18. The internal combustion engine according to claim 11, wherein the fluid in the upper space flows to the intake passage through the first passage and fresh air in the intake passage flows to the upper space through the second passage, when in a natural aspiration operation where the supercharger is not driven, and
wherein the fluid in the upper space flows to the upstream portion of the intake passage located on the upstream side with respect to the supercharger, when in a supercharged operation where the supercharger is driven.

19. The internal combustion engine according to claim 11, wherein the intake passage further comprises:
a bypass passage that connects the upstream portion of the intake passage with respect to the supercharger to the downstream portion of the intake passage with respect to the supercharger; and
a bypass valve that opens and closes the bypass passage.

20. The internal combustion engine according to claim 19, further comprising:
an intercooler provided in the downstream portion of the intake passage with respect to the supercharger,
wherein a downstream side of the bypass passage connects to the downstream portion of the intake passage at a first location downstream of the supercharger and upstream of the intercooler,
wherein an upstream side of the bypass passage connects at a second location downstream of the second passage connecting to the intake passage and upstream of the supercharger, and
wherein the first passage connects to the intake passage at a third location downstream of the intercooler.

* * * * *